July 1, 1924.
R. B. HARTMAN
1,499,529
BRAKE BAND AND LINING
Original Filed Feb. 4, 1920    2 Sheets-Sheet 1
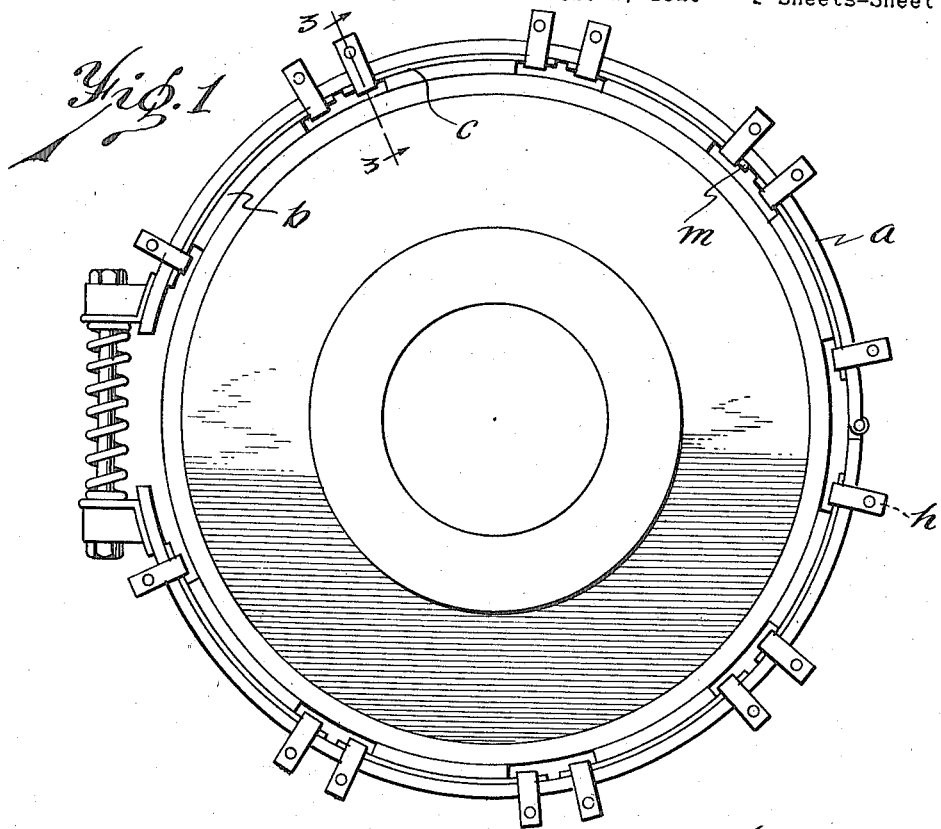
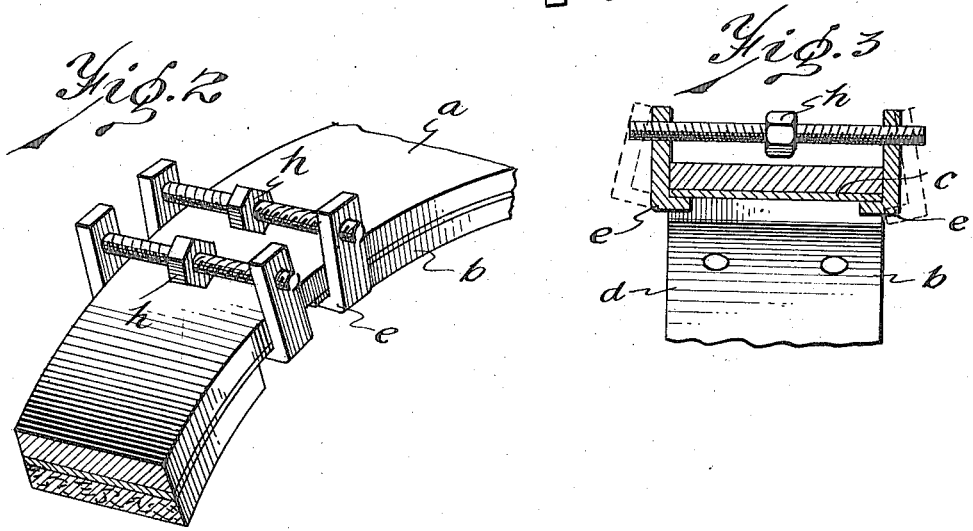
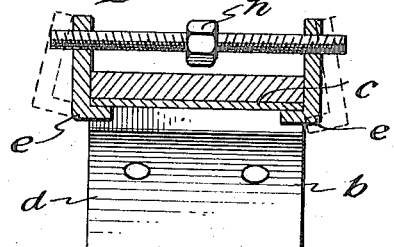
Inventor
Richard B Hartman
By Stuart C Barnes
Attorney July 1, 1924.  
R. B. HARTMAN  
BRAKE BAND AND LINING  
Original Filed Feb. 4, 1920   2 Sheets-Sheet 2
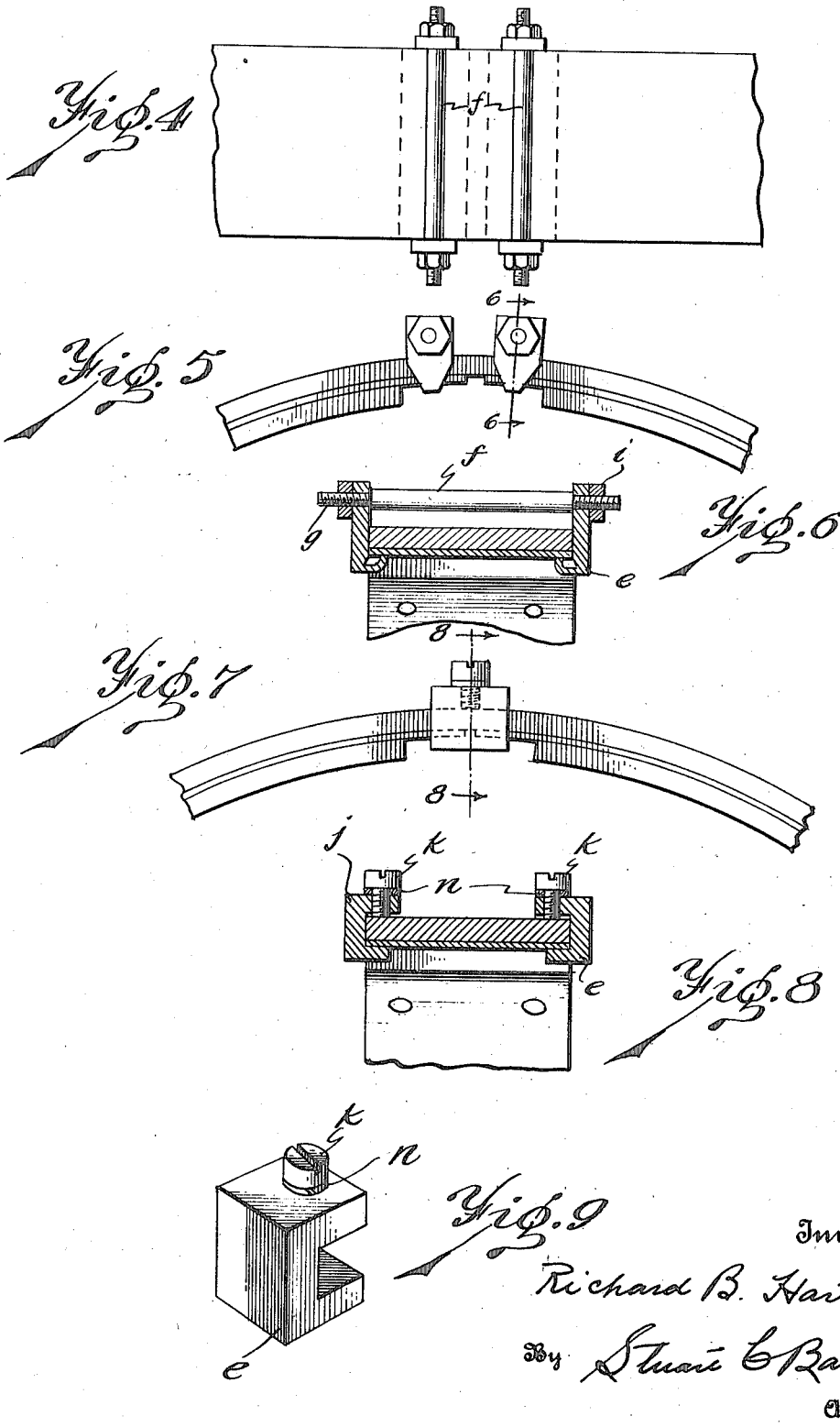

Patented July 1, 1924.

1,499,529

UNITED STATES PATENT OFFICE.

RICHARD B. HARTMAN, OF CORDELL, OKLAHOMA, ASSIGNOR TO HARTMAN BRAKE CORPORATION.

BRAKE BAND AND LINING.

Application filed February 4, 1920, Serial No. 356,337. Renewed December 18, 1923.

*To all whom it may concern:*

Be it known that I, RICHARD B. HARTMAN, a citizen of the United States, residing at Cordell, in the county of Washita and State of Oklahoma, have invented certain new and useful Improvements in Brake Bands and Linings, of which the following is a specification.

This invention relates to brakes and brake linings, and has for its object an improved way of removably securing the brake lining segments to the brake band so that by simply loosening the securing devices any one of the segments may be removed and replaced by a new segment when desired.

In a co-pending application 355,285 I have more generically described and claimed the improvement in lining brakes by utilizing removable brake lining segments. It is the object of the present invention to afford a removable brake lining segment construction which can be mounted on any ordinary brake drum in place of the usual unit lining that has heretofore been employed. There are several modifications of the main idea here broadly described, which will be described in detail after the figures have been enumerated.

In the drawings,—
Fig. 1 is a side elevation of a brake drum and my improved brake lining clamped in place.

Fig. 2 is a fragmentary perspective of the same.
Fig. 3 is a cross section of the same on the line 3—3 of Fig. 1.

Fig. 4 is a fragmentary plan view of a modified form.

Fig. 5 is a fragmentary side elevation of the same.

Fig. 6 is a cross section on the line 6—6 of Fig. 5.

Fig. 7 is a fragmentary side elevation of still another modified form.
Fig. 8 is a cross section on the line 8—8 of Fig. 7.

Fig. 9 is a perspective of one of the clamps.

*a* designates the conventional brake band which is ordinarily lined with a strip of brake lining that extends around the entire inner circumference of the band. In place of such a lining I employ a plurality of brake lining segments *b*, each of which is made up with a backing of metal designated *c* and a brake lining material *d* that can be riveted or otherwise fastened thereto. The brake lining material does not extend clear to the end of the metal backing but falls short thereof and leaves exposed end portions *m* which are adapted to be engaged by the jaws *e* of the several forms of clamps that I have illustrated in the drawings.

In Figs. 1 to 3 inclusive the jaws *e* are either spread or contracted upon the brake band and the brake lining segments by means of a sort of turnbuckle that is a threaded bolt that has both right and left hand threads running through the jaws and which may be turned by the head *h* to either release the clamping jaws *e* or tighten them on the band and segment.

In the form shown in Figs. 4, 5 and 6, a very similar form of jaw is used, but instead of a turnbuckle, a stud *f* with reduced ends *g* that are threaded is used and nuts *i* are run on the threaded reduced ends *g* to either allow the jaws to be released or else to force them upon the band and the removable segment.

In the form shown in Figs. 8 and 9, the jaws are entirely separate but each jaw is provided with an overhanging portion *j* through which is threaded the screw *k* which may be turned down upon the top of the brake band to securely clamp the brake lining segment to the brake band. Preferably lock washers *n* are employed between the overhanging portion and the head of the screws *k*.

In all of these forms of construction when the clamping jaws are locked to the brake band and hold the brake lining segment in place, the brake lining segment is held against both longitudinal and transverse movement. Simply by releasing the jaws the brake band segment may be removed between the drum and the band and the new segment replaced without in any way disassembling the brake parts. The jaws may then be replaced and clamped again in position. No special form of band is required for these several forms of jaw clamps.

What is claimed is:

1. In a brake, the combination of a brake band, a plurality of brake-lining segments which can be removably secured thereto, and jaw clamps for securing the brake lining segments to the band.

2. In a brake, the combination of a band, a plurality of removable brake lining segments comprising each a backing of rigid material and a brake lining material carried thereby, and jaw clamps for removably securing the brake lining segments to the band.

3. In a brake, the combination of a band, a plurality of brake lining segments, and jaw clamps having the jaw portions engaging against the brake lining segment to secure the same to the band and provided with means for tightening the jaws on the band.

4. In a brake, the combination of a band, a plurality of removable brake lining segments comprising each a backing of metal and a brake lining material extending short of the ends, and a plurality of jaw clamps adapted to engage the band and the exposed end portions of the backings to removably clamp the segments to the band.

5. In a brake, the combination of a band, a plurality of brake lining segments comprising each a backing of metal and a brake lining material extending short of the ends, and removable jaws adapted to engage the adjoining exposed ends of the backings of the brake lining segments, and means for clamping the jaws removably to the band.

In testimony whereof I affix my signature.

RICHARD B. HARTMAN.